United States Patent [19]

Niimi

[11] Patent Number: 5,813,285
[45] Date of Patent: Sep. 29, 1998

[54] MANUAL TRANSMISSION WITH REMOTE CONTROLLER MECHANISM

[75] Inventor: Tsutomu Niimi, Isehara, Japan

[73] Assignee: Nissan Motor Co., Ltd., Yokohama, Japan

[21] Appl. No.: 733,107

[22] Filed: Oct. 16, 1996

[30] Foreign Application Priority Data

Oct. 16, 1995 [JP] Japan .................................. 7-267126

[51] Int. Cl.[6] .............................. F16H 3/00; F16H 59/04
[52] U.S. Cl. ...................................... 74/473.3; 74/471 R
[58] Field of Search .......................... 74/473 R, 471 R, 74/469, 473.3

[56] References Cited

U.S. PATENT DOCUMENTS

| 5,036,722 | 8/1991 | Park | 74/473 R |
|---|---|---|---|
| 5,052,238 | 10/1991 | Sewell | 74/473 R |
| 5,052,239 | 10/1991 | Ubagai | 74/473 R |
| 5,063,810 | 11/1991 | Fujii | 74/473 R |
| 5,259,263 | 11/1993 | Lyckberg | 74/473 R |
| 5,331,863 | 7/1994 | Kobayashi et al. | 74/473 R |
| 5,357,822 | 10/1994 | Lanting et al. | 74/473 R |
| 5,357,823 | 10/1994 | Parsons | 74/473 R |
| 5,363,715 | 11/1994 | Huggins et al. | 74/473 R |

OTHER PUBLICATIONS

"Introduction of C23 Series Vanette Serena Nissan", Nissan Service Manual (C23–1), Jun. 1991, Nissan Motor Co., Ltd.

Primary Examiner—Rodney H. Bonck
Assistant Examiner—David M. Fenstermacher
Attorney, Agent, or Firm—Foley & Lardner

[57] ABSTRACT

A manual transmission remotely controlled by a speed change lever comprises a transmission casing. A plurality of parallel fork shafts extend in the casing. A striking rod extends in the casing in parallel with the fork shafts. The striking rod is pivotal about an axis thereof to engage with selected one of the fork shafts, and slidable along the axis to axially move the selected fork shaft to a desired position thereby to engage a corresponding coupling sleeve with a desired gear. An input block is connected to the striking rod to move therewith. A remote controller mechanism is connected to the transmission casing, which transmits a select operation of the speed change lever to the input block to cause the pivoting movement of the striking rod about the axis thereof and transmits a shift operation of the speed change lever to the input block to cause the sliding movement of the striking rod along the axis.

5 Claims, 5 Drawing Sheets

MANUAL TRANSMISSION WITH REMOTE CONTROLLER MECHANISM

BACKGROUND OF THE INVENTION

1. Field of the Invention

The present invention relates in general to a manual transmission for a motor vehicle, and more particularly to a remote controller mechanism possessed by the manual transmission, through which the movement of a speed change lever in the vehicle cabin is remotely transmitted to shift forks of the transmission.

2. Description of the Prior Art

Usually, the select/shift operation of a speed change lever is transmitted to shift forks of the transmission through a movement transmission mechanism installed in a rear extension of a transmission casing. Thus, the construction of the movement transmission mechanism differs largely between a case wherein, like in a front engine rear drive (viz., FR type) motor vehicle having a longitudinally arranged engine, the transmission is so arranged as to place the rear extension near the speed change lever and a case wherein, like in a front engine front drive (viz., FF type) motor vehicle having a transversely arranged engine, the transmission is so arranged as to place the rear extension away from the speed change lever.

In order to clarify the task of the present invention, two conventional manual transmissions particularly used in the above-mentioned cases will be described with reference to the accompanying drawings.

One of the conventional transmission is shown in FIG. 3, which is employed in the former case. For ease of description, this type transmission will be referred to as "direct control type". That is, in this transmission, a speed change lever 30 is directly mounted to a rear extension of a transmission casing 32. For achieving a universal movement relative to the rear extension, the speed change lever 30 has a ball joint 31. A lower actuating end of the speed change lever 30 is pivotally connected to an input block 35 which is eccentrically connected to a striking rod 33. The striking rod 33 has a striking lever 34 secured thereto. Denoted by reference "S" is one of coupling sleeves employed in the transmission. Although not shown in the drawing, shift forks carried on respective fork shafts are operatively engaged with the coupling sleeves "S". The fork shafts extend in parallel along the common axis "O1" of input and output shafts 1 and 2. Denoted by numeral 3 is a counter shaft.

When the speed change lever 30 is manipulated by a driver for carrying out a select operation, the lower actuating end of the lever 30 pivots, through the input block 35, the striking rod 33 about an axis thereof. With this, the striking lever 34 is pivoted and selectively engaged with one of fork shafts (not shown), for example, the fork shaft having a shift fork engaged with the coupling sleeve "S". When then the speed change lever 30 is manipulated by the driver for carrying out a shift operation, the lower actuating end of the lever 30 moves, through the input block 35, the striking rod 33 along the axis thereof. With this, the striking lever 34 is moved together with the striking rod 33 along the axis and thus the selected fork shaft is axially moved shifting the coupling sleeve "S" in one or the other direction for achieving coupling with a desired gear. With this, a desired gear position is assumed by the transmission.

The other conventional transmission is shown in FIGS. 4 and 5, which is employed in the latter case. For ease of description, this type transmission will be referred to as "remote control type". In this case, the transmission is so arranged as to place the rear extension away from a speed change lever (not shown). The transmission has therein a remote controller mechanism which is clearly shown in NISSAN SERVICE MANUAL (C23-1) titled "INTRODUCTION OF C23 SERIES VANETTE SERENA NISSAN" issued in June 1991 from NISSAN MOTOR CO., LTD.

In the drawings, denoted by numeral 20 is a transmission casing. Denoted by reference O1 is a longitudinal axis of the casing 20. Within the casing 20, there longitudinally extend three parallel fork shafts 22a, 22b and 22c which carry thereon a 1-2 shift fork 21a, a 3-4 shift fork 21b and a 5-R shift fork 21c respectively. These shift forks 21a, 21b and 21c are respectively engaged with a 1-2 coupling sleeve, a 3-4 coupling sleeve and a 5-R coupling sleeve (not shown) in a known manner. To right end portions of the three fork shafts 22a, 22b and 22c, there are respectively secured a 1-2 shift bracket 24a, a 3-4 shift bracket 24b and a 5-R shift bracket 24c. A cross shaft 25 extends transversely in the transmission casing 20. The cross shaft 25 is movable along an axis thereof and pivotal about the axis thereof. An inner change lever 23 is secured to the cross shaft 25 to move therewith. The inner change lever 23 is loosely caught by a fork-shaped end of an inner select lever 28 which is secured to an inner end of a pivot pin 29. The pivot pin 29 is rotatably connected to the casing 20. An outer select lever 26 is secured to an exposed outer end of the pivot pin 29.

As is understood from FIG. 5 which is a view taken along the line V—V of FIG. 4, one end portion of the cross shaft 25 is exposed to the outside of the casing 20, and an outer shift lever 27 is secured to the exposed end of the cross shaft 25. A select operation transmitting cable (not shown) and a shift operation transmitting cable (not shown), which extend from a speed change lever (not shown) in a vehicle cabin, are respectively connected to the outer select lever 26 and the outer shift lever 27 respectively.

Thus, it will be appreciated that in this remote control type transmission, there are no parts corresponding to the input block 35, the striking rod 33, the striking lever 34 which are employed in the above-mentioned direct control type transmission of FIG. 3.

When, as is understood from FIG. 4, the speed change lever in the vehicle cabin is manipulated by a driver for carrying out a select operation, the select operation transmitting cable is actuated pivoting the inner select lever 28 through the outer select lever 26. With this, the inner change lever 23 is moved straightly together with the cross shaft 25 in the axial direction of the cross shaft 25 (that is, leftward or rightward in FIG. 5), and thus, the inner change lever 23 becomes engaged with selected one of the shift brackets 24a, 24b and 24c, for example, the shift bracket 24b. When then the speed change lever is manipulated for carrying out a shift operation, the shift operation transmitting cable is actuated pivoting the cross shaft 25 about the axis thereof through the outer shift lever 27. With this, the inner change lever 23 secured to the cross shaft 25 is pivoted in the same direction and thus the selected shift bracket 24b is moved sliding the corresponding fork shaft 22b in the axial direction thereof (that is, leftward or rightward in FIG. 4). With this, the corresponding shift fork 21b shifts the corresponding coupling sleeve in one or the other direction to achieve coupling with a desired gear. With this, a desired gear position is assumed by the transmission.

SUMMARY OF THE INVENTION

It is an object of the present invention to provide a remote control type manual transmission which can be constructed by making a slight modification to the direct control type transmission of FIG. 3.

It is another object of the present invention to provide a remote control type manual transmission which is easily changed to a direct control type manual transmission without making a marked modification thereto.

It is still another object of the present invention to provide a remote control type manual transmission which has both an advantage exclusively possessed by the direct control type transmission of FIG. 3 and an advantage exclusively possessed by the remote control type transmission of FIG. 4 and 5.

According to the present invention, there is provided a manual transmission of a type which is remotely controlled by a speed change lever. The transmission comprises a transmission casing; a plurality of parallel fork shafts which extend in the casing; a striking rod which extends in the casing in parallel with the fork shafts, the striking rod being pivotal about an axis thereof to engage with selected one of the fork shafts, and slidable along the axis to axially move the selected fork shaft to a desired position thereby to engage a corresponding coupling sleeve with a desired gear; an input block connected to the striking rod to move therewith; and a remote controller mechanism which transmits a select operation of the speed change lever to the input block to cause the pivoting movement of the striking rod about the axis thereof and transmits a shift operation of the speed change lever to the input block to cause the sliding movement of the striking rod along the axis.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
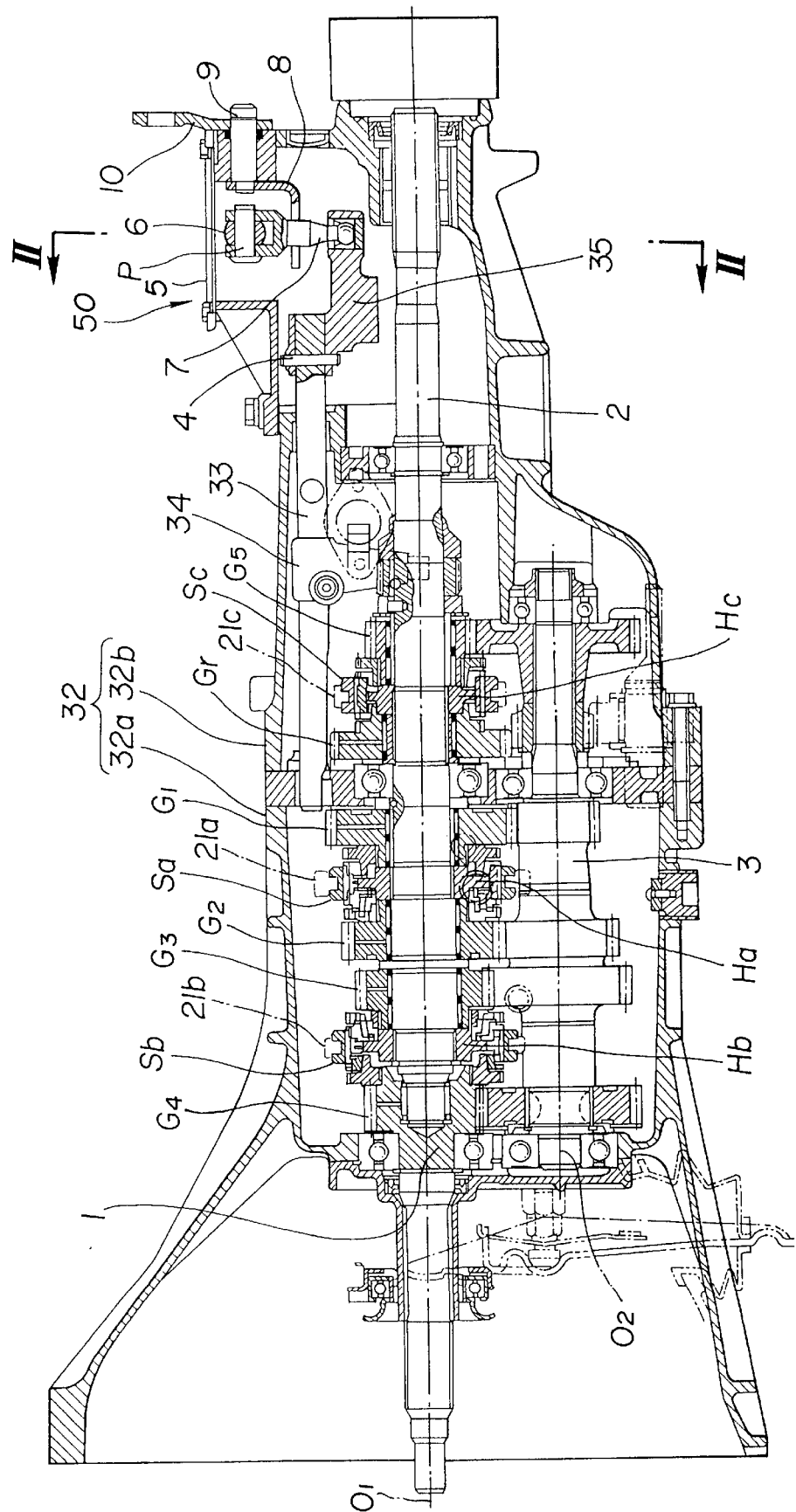
FIG. 1 is a sectional view of a manual transmission according to the present invention.
Figure 2:
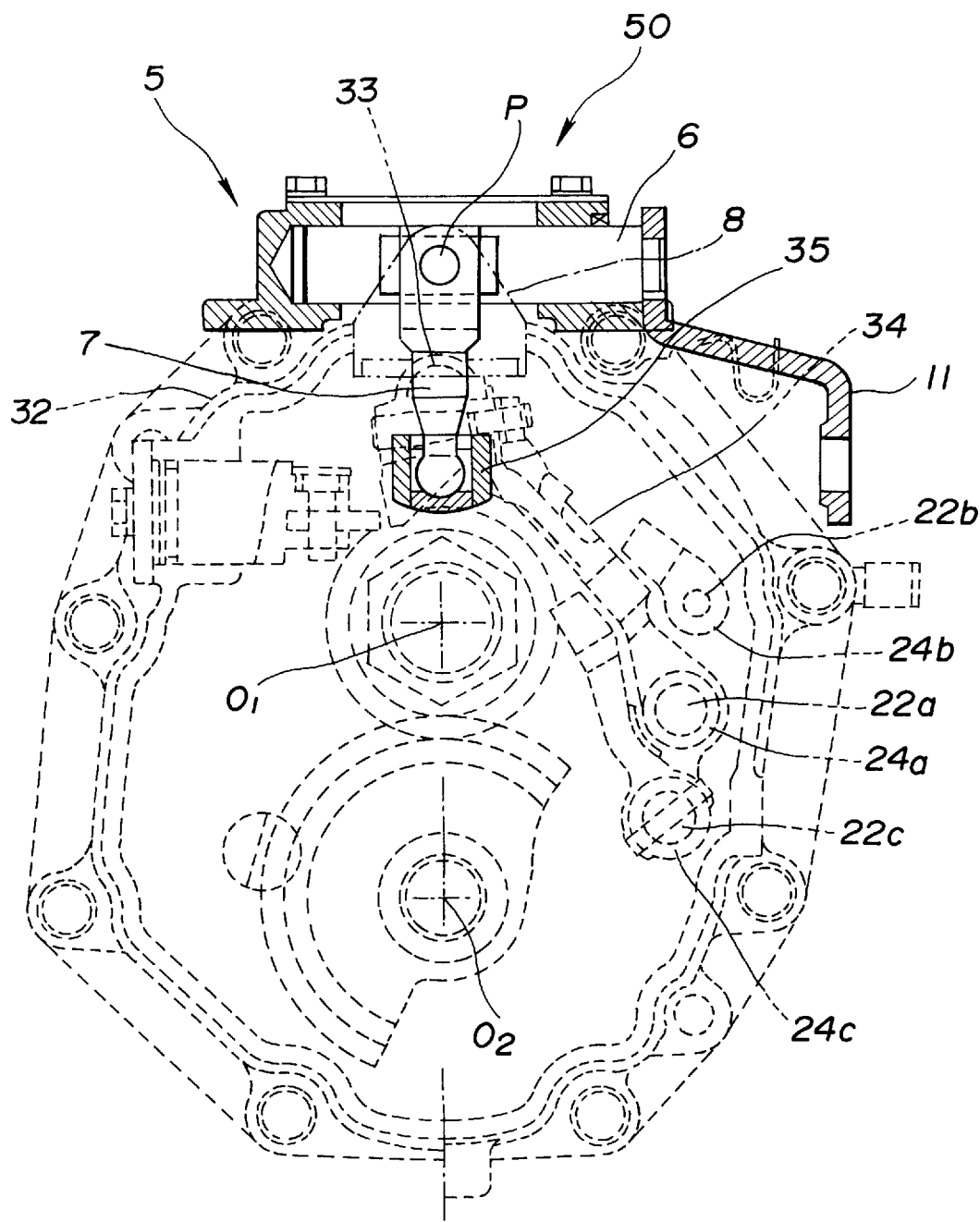
FIG. 2 is an enlarged sectional view taken along the line II—II of FIG. 1.

Referring to FIGS. 1 and 2, there is shown a remote control type manual transmission according to the present invention. The transmission shown is a five forward speed one reverse transmission designed to be mounted on a front engine rear drive (viz., FR type) motor vehicle. More specifically, the transmission is designed to be incorporated with a transversely mounted engine.

In FIG. 1, designated by numeral 32 is a transmission casing which comprises a front casing 32a which houses an engine driven input mechanism and a rear casing 32b which houses a change speed output mechanism. The rear casing 32b constitutes a rear extension of the casing 32.

Designated by numeral 1 is an input shaft to which engine torque is applied, and designated by numeral 2 is an output shaft which extends in alignment with the input shaft 1. It is to be noted that the common axis of the input and output shafts 1 and 2 is denoted by reference "O1". Beside the output shaft 2, there extends a counter shaft 3 which has a gear (no numeral) meshed with an input gear G4 on the input shaft 1. It is to be noted that the axis of the counter shaft 3 is denoted by reference "O2".

About the output shaft 2, there are rotatably disposed a third speed gear G3, a second speed gear G2, a first speed gear G1, a reverse gear Gr and a fifth speed gear G5 in order. The input gear G4 of the input shaft 1 serves as a fourth speed gear for the output shaft 2. Furthermore, a 1-2 synchronizing hub Ha, a 3-4 synchronizing hub Hb and a 5-R synchronizing hub Hc are disposed about the output shaft 2 establishing a spline connection with the output shaft 2. These synchronizing hubs Ha, Hb and Hc have a 1-2 coupling sleeves Sa, a 3-4 coupling sleeve Sb and a 5-R coupling sleeve Sc respectively incorporated therewith. These sleeves Sa, Sb and Sc have a 1-2 shift fork 21a, a 3-4 shift fork 21b and a 5-R shift fork 21c respectively incorporated therewith. That is, by the shift forks, the coupling sleeves Sa, Sb and Sc are moved axially, that is, forward or rearward on the output shaft 2.

Designated by numeral 33 is a striking rod which has a striking lever 34 secured thereto. An input block 35 is eccentrically connected to a right end portion of the striking rod 33 though a pin 4. Similar to the above-mentioned conventional "direct control type" transmission of FIG. 3, upon application of the select or shift operation force to the input block 35 from a speed change lever (not shown), the striking rod 33 is pivoted about an axis thereof or moved along the axis. Upon achieving both the select operation and shift operation, a desired gear position is assumed by the transmission, as will be described in detail hereinafter.

As is seen from FIG. 2, three, that is, a 1-2 fork shaft 22a, a 3-4 fork shaft 22b and a 5-R fork shaft 22c which carry respectively thereon the above-mentioned shift forks 21a, 21b and 21c extend in parallel along the common axis "O1" of the input and output shafts 1 and 2. A 1-2 shift bracket 24a, a 2-3 shift bracket 24b and a 5-R shift bracket 24c are secured to end portions of the three fork shafts 22a, 22b and 22c respectively. These shift brackets 24a, 24b and 24c have respective leading ends which are arranged concentric with the striking rod 33 to be operatively engageable with the striking lever 34.

Figure 3:
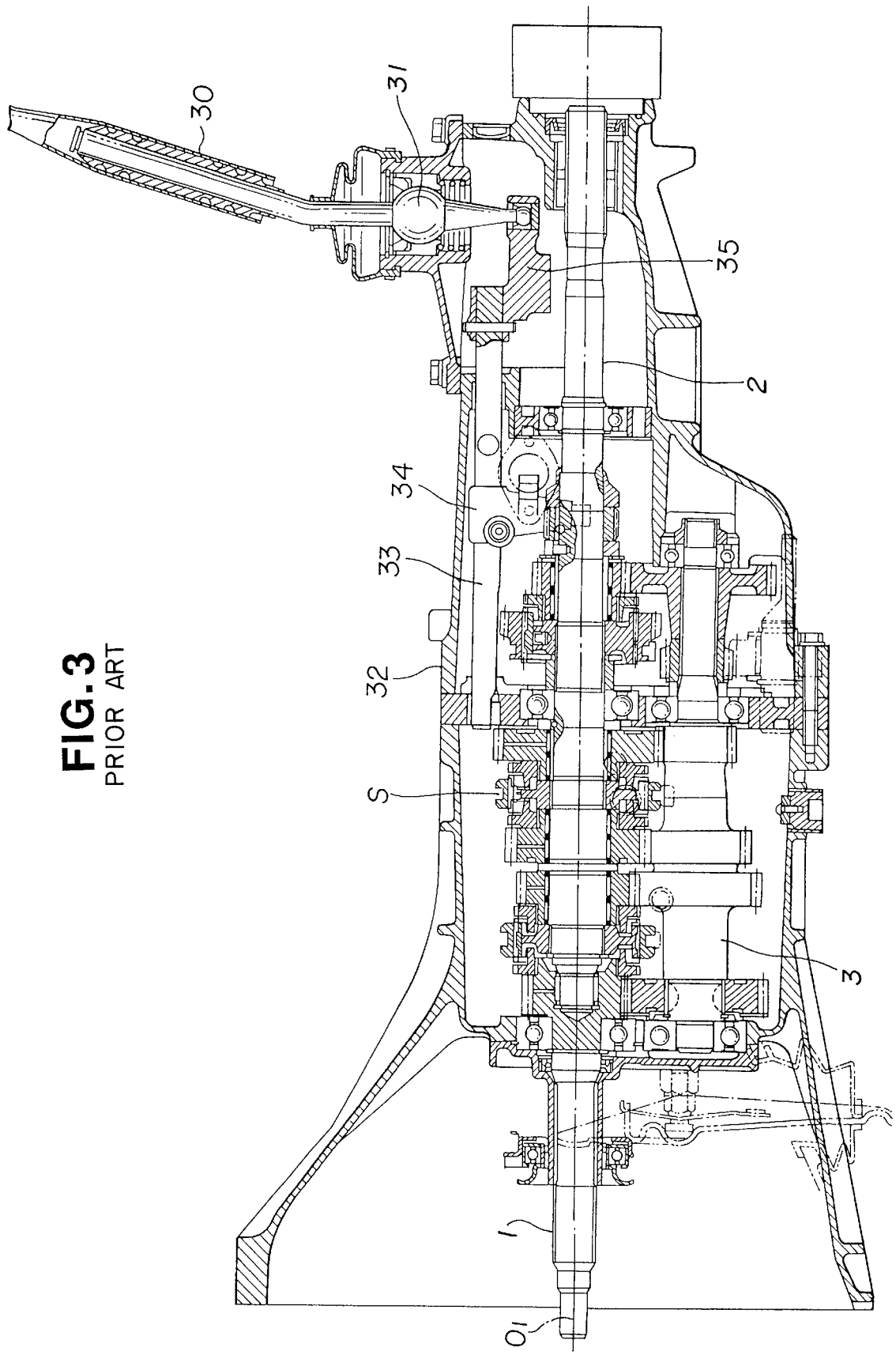
FIG. 3 is a sectional view of a conventional manual transmission of a so-called "direct control type"

As will be understood from the above description, the major construction of the transmission of the present invention is substantially the same as that of the above-mentioned conventional "direct control type" transmission of FIG. 3.

In accordance with the present invention, a unique remote controller mechanism 50 is employed which is arranged in the rear extension part of the transmission, as shown in FIG. 1.

As is shown in FIG. 1, the remote controller mechanism 50 comprises a control box 5 which is detachably connected to a rear part of the transmission rear casing 32b. Within the control box 5, there is arranged a cross shaft 6 which extends transverse or perpendicular relative to the common axis "O1" of the input and output shafts 1 and 2. The cross shaft 6 is pivotal about an axis thereof. An inner change lever 7 is pivotally connected to the cross shaft 6 through a pivot pin "P". The axis of the pivot pin "P" extends perpendicular to the axis of the cross shaft 6. A lower actuating end of the inner change lever 7 is pivotally connected to the input block 35. More specifically, a ball joint connection is established between the inner change lever 7 and the input block 35, as shown. The inner change lever 7 is loosely caught by a fork-shaped end of an inner select lever 8 which is secured at a perpendicularly bent portion thereof to an inner end of a pivot shaft 9. The pivot shaft 9 is rotatably connected to the control box 5. An outer select lever 10 is secured to an exposed outer end of the pivot shaft 9.

As is seen from FIG. 2, the cross shaft 6 has one end exposed to the outside of the control box 5. An outer shift lever 11 is secured to the exposed end of the cross shaft 6.

A select operation transmitting cable (not shown) and a shift operation transmitting cable (not shown), which extend from a speed change lever (not shown) in a vehicle cabin, are respectively connected to the outer select lever 10 and the outer shift lever 11. Thus, it will be appreciated that a select operation of the speed change lever induces a pivot movement of the striking lever 34 about the axis of the striking rod 33 for engagement with selected one of the shift brackets 24a, 24b and 24c which are secured to the shift shafts 22a, 22b and 22c, and a subsequent shift operation of the speed change lever induces an axial movement of the selected shift shaft for engagement of the coupling sleeve with a desired gear.

In the following, operation of the remote controller mechanism 50 will be described with reference to FIG. 1. For ease of understanding, the description will be made with respect to a speed change operation wherein the speed change lever is moved from "N" (neutral) position to "R" (reverse) position by a driver.

When the speed change lever is moved straightly to an entrance for "R" position, only the select operation transmitting cable is actuated, which pivots the inner select lever 8 through the outer select lever 10. With this, the inner change lever 7 pivots the striking rod 33 about the axis thereof through the input block 35 bringing the striking lever 34 into engagement with the 5-R shift bracket 24c. That is, in FIG. 2, due to the movement of the speed change lever to the entrance for "R" position, the striking lever 34 is pivoted clockwise and engaged with the 5-R shift bracket 24c.

When then the speed change lever is moved sideward from the "R" position entrance to the "R" position, only the shift operation transmitting cable is actuated, which pivots the cross shaft 6 about the axis thereof. With this, the inner change lever 7 is pivoted about the axis of the cross shaft 6 thereby sliding the striking rod 33 axially together with the striking lever 34 and thus the selected fork shaft 22c is moved together with the shift bracket 24c to a final position to bring the 5-R coupling sleeve "Sc" into engagement with the reverse gear "Gr". Under this condition, rotation of the counter shaft 3 is transmitted to the output shaft 2 through the reverse gear "Gr". Because, under this condition, an idle gear (no numeral) is interposed between the counter shaft 3 (more specifically, a gear of the counter shaft 3) and the reverse gear "Gr", the direction of rotation of the outer shaft 2 is opposite to that of the input shaft 1.

In the following, advantages of the present invention will be described.

First, the remote control type manual transmission of the present invention can be constructed by making a slight modification to the conventional direct control type manual transmission of FIG. 3. In fact, for producing the transmission of the invention, it is only necessary to replace the speed change lever 30 of FIG. 3 with the remote controller mechanism 50.

Second, the remote control type manual transmission of the invention can be easily changed to a direct control type manual transmission, such as one shown in FIG. 3, without making a marked modification thereto. That is, for changing the type, it is only necessary to replace the remote controller mechanism 50 with a speed change lever 30.

Figure 4:
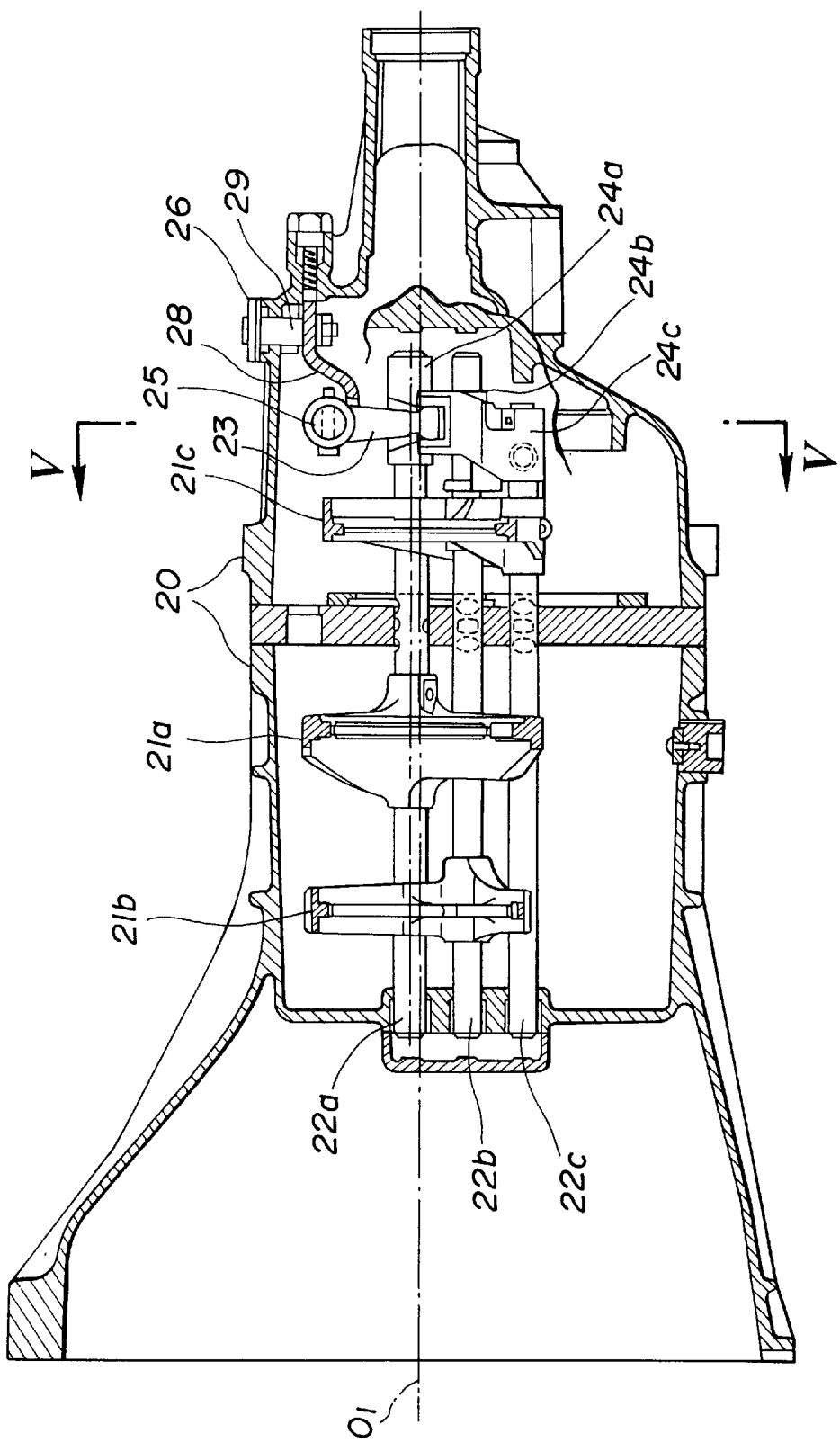
FIG. 4 is a sectional view of a conventional manual transmission of a so-called "remote control type"
Figure 5:
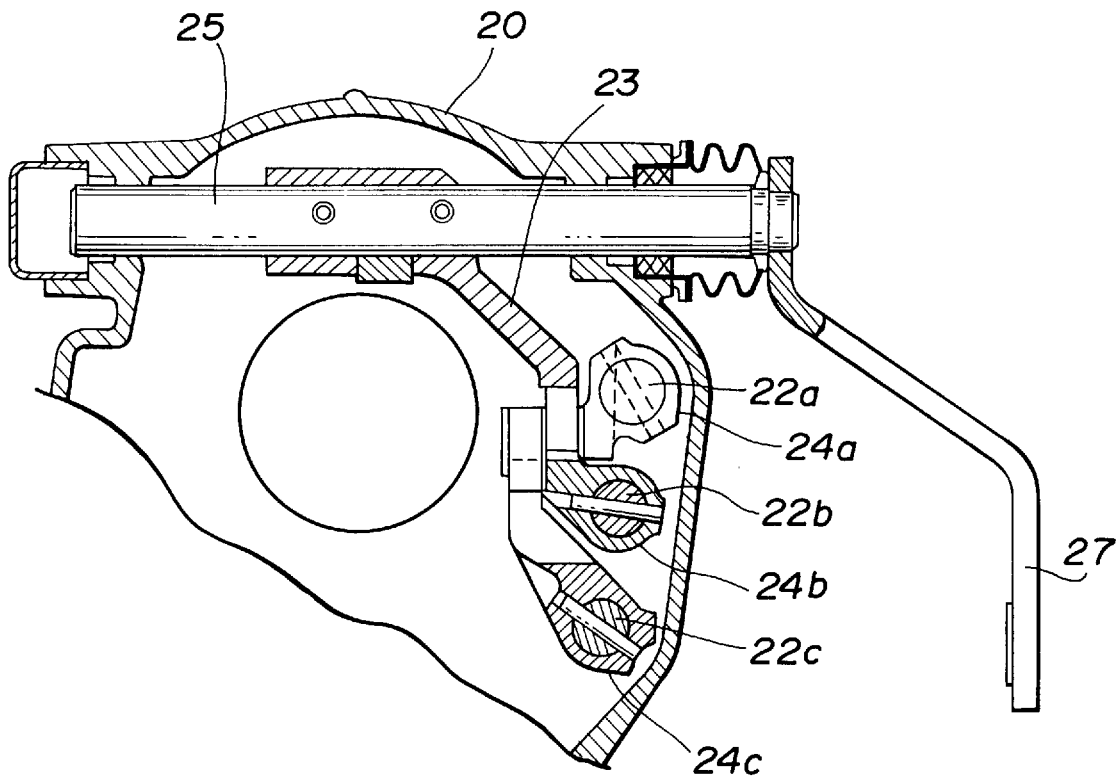
FIG. 5 is a sectional but partial view taken along the line V—V of FIG. 4.

Third, unlike the case of the conventional remote control type transmission of FIG. 4, the cross shaft 6 employed in the invention functions to only pivot about an axis thereof. While, the cross shaft 25 of the conventional one is arranged to slide along an axis thereof and pivot about the axis. That is, in the conventional one, it is inevitably necessary to provide any measure by which the axial displacement of the cross shaft 25 has no bad effect on the shift operation transmitting cable connected thereto. Furthermore, as is seen from FIG. 5, the axial movement of the cross shaft 25 needs a certain extra space for the cross-shaft 25, which is against the space saving particularly needed for downsizing the transmission. While, in the invention, the cross shaft 6 does not slide and thus it is free of such drawbacks.

What is claimed is:

1. A manual transmission remotely controlled by a speed change lever, said transmission comprising:

a transmission casing;

a plurality of parallel fork shafts which extend in said casing;

a striking rod which extends within said casing, in parallel with said fork shafts, said striking rod being pivotal about an axis thereof to engage a selected one of said fork shafts, and slidable along said axis to axially move the selected fork shaft to a desired position which engages a corresponding coupling sleeve with a desired gear;

an input block connected to said striking rod to move therewith; and a remote controller mechanism which transmits select and shift operations of said speed change lever to said input block the remote controller mechanism including:

a box detachably connected to the transmission casing;

an inner change lever movably mounted in the box, the inner change lever having one end pivotally connected with the input block;

a first structure for pivoting the inner chance lever about a first pivot center in a first direction to cause a pivoting movement of the striking rod about the axis thereof when the shift operation is carried out by the speed change lever; and a second structure for pivoting the inner change lever about a second pivot center in a second direction to cause a sliding movement of the striking rod along the axis thereof when the shift operation is carried out by the speed change lever, wherein the first and second directions are perpendicular to each other, and the first and second pivot centers are the same.

2. A manual transmission as claimed in claim 1, wherein said first structure comprises:

an inner select lever having a fork-shaped end catching said inner change lever;

a pivot shaft pivotally connected to said box, said pivot shaft having one end secured to the other end of said inner select lever; and an outer select lever secured to the other end of said pivot shaft.

3. A manual transmission as claimed in claim 2, wherein said first structure further comprises a select operation transmitting cable which extends from said outer select lever to said speed change lever.

4. A manual transmission as claimed in claim 1, wherein said second structure comprises:

a cross shaft extending transversely in said box and pivotal about an axis thereof, said cross shaft having an outer end exposed to the outside of said box;

a pivot pin for pivotally connecting the other end of said inner change lever to said cross shaft; and an outer shift lever secured to the exposed outer end of said cross shaft.

5. A manual transmission as claimed in claim 4, wherein said second structure further comprises a shift operation transmitting cable which extends from said outer shift lever to said speed change lever.

* * * * *